United States Patent
Masubuchi

[11] Patent Number: 6,079,030
[45] Date of Patent: *Jun. 20, 2000

[54] MEMORY STATE RECOVERING APPARATUS

[75] Inventor: Yoshio Masubuchi, Kawasaki, Japan

[73] Assignee: Kabushiki Kaisha Toshiba, Kawasaki, Japan

[*] Notice: This patent is subject to a terminal disclaimer.

[21] Appl. No.: 09/317,915

[22] Filed: May 25, 1999

Related U.S. Application Data

[63] Continuation of application No. 08/665,628, Jun. 18, 1996, Pat. No. 5,913,021.

[30] Foreign Application Priority Data

Jun. 19, 1995 [JP] Japan .................................. 7-151736

[51] Int. Cl.[7] ........................................... G06F 11/00
[52] U.S. Cl. ............................................... 714/15
[58] Field of Search .................................. 714/15, 20, 18, 714/13, 16, 17, 47; 395/569; 711/141, 144, 142, 143, 145, 146

[56] References Cited

U.S. PATENT DOCUMENTS

| | | |
|---|---|---|
| 3,588,829 | 6/1971 | Boland et al. . |
| 3,736,566 | 5/1973 | Anderson et al. . |
| 3,761,881 | 9/1973 | Anderson et al. . |
| 3,803,560 | 4/1974 | DeVoy et al. . |
| 3,889,237 | 6/1975 | Alferness et al. . |
| 3,979,726 | 9/1976 | Lange et al. . |
| 4,020,466 | 4/1977 | Cordi et al. . |
| 4,044,337 | 8/1977 | Hicks et al. . |
| 4,164,017 | 8/1979 | Randell et al. . |
| 4,228,496 | 10/1980 | Katzman et al. . |
| 4,373,179 | 2/1983 | Katsumata . |
| 4,393,500 | 7/1983 | Imazeki et al. . |
| 4,403,284 | 9/1983 | Sacarisen et al. . |
| 4,413,327 | 11/1983 | Sabo et al. . |
| 4,426,682 | 1/1984 | Riffe et al. . |
| 4,459,658 | 7/1984 | Gabbe et al. . |
| 4,484,273 | 11/1984 | Stiffler et al. . |
| 4,513,367 | 4/1985 | Chan et al. . |
| 4,566,106 | 1/1986 | Check, Jr. . |
| 4,654,819 | 3/1987 | Stiffler et al. . |
| 4,734,855 | 3/1988 | Banâtre et al. . |
| 4,740,969 | 4/1988 | Fremont . |
| 4,751,639 | 6/1988 | Corcoran et al. . |
| 4,805,095 | 2/1989 | Armstrong et al. . |
| 4,814,971 | 3/1989 | Thatte . |
| 4,817,091 | 3/1989 | Katzman et al. . |
| 4,819,154 | 4/1989 | Stiffler et al. . |
| 4,819,232 | 4/1989 | Krings . |
| 4,905,196 | 2/1990 | Kirrmann . |
| 4,924,466 | 5/1990 | Gregor et al. . |
| 4,941,087 | 7/1990 | Kap . |
| 4,958,273 | 9/1990 | Anderson et al. . |

(List continued on next page.)

FOREIGN PATENT DOCUMENTS

| | | |
|---|---|---|
| 2 503 900 | 10/1982 | France . |
| 59-57351 | 4/1984 | Japan . |
| 59-144956 | 8/1984 | Japan . |
| WO 93/08528 | 4/1993 | WIPO . |

*Primary Examiner*—Robert W. Beausoliel, Jr.
*Assistant Examiner*—Pierre Elisca
*Attorney, Agent, or Firm*—Finnegan, Henderson, Farabow, Garrett & Dunner, L.L.P.

[57] ABSTRACT

In a memory state recovering apparatus, processors process data and a main memory holds data necessary for the data processing at the processors. Caches are provided to correspond to the processors and have the function of issuing an invalidation transaction to specify the invalidation of the data to maintain the consistency of the data. A before image buffer combines an address in the main memory with the data held in the location indicated by the address and stores the combination. A memory access control section stores in the buffer memory the address targeted in the main memory and the data stored in the location indicated by the address in accordance with the invalidation transaction issued from the caches. With this configuration, the time required for a checkpoint process can be shortened, thereby improving the system performance.

10 Claims, 9 Drawing Sheets

U.S. PATENT DOCUMENTS

| | | |
|---|---|---|
| 4,964,126 | 10/1990 | Musicus et al. . |
| 4,965,719 | 10/1990 | Shoens et al. . |
| 5,157,663 | 10/1992 | Major et al. . |
| 5,214,652 | 5/1993 | Sutton . |
| 5,239,637 | 8/1993 | Davis et al. . |
| 5,247,618 | 9/1993 | Davis et al. . |
| 5,269,017 | 12/1993 | Hayden et al. . |
| 5,271,013 | 12/1993 | Gleeson . |
| 5,276,848 | 1/1994 | Gallagher et al. . |
| 5,313,647 | 5/1994 | Kaufman et al. . |
| 5,325,517 | 6/1994 | Baker et al. . |
| 5,325,519 | 6/1994 | Long et al. . |
| 5,327,532 | 7/1994 | Ainsworth et al. . |
| 5,408,649 | 4/1995 | Beshears et al. . |
| 5,488,716 | 1/1996 | Schneider et al. . |
| 5,488,719 | 1/1996 | Kaplan et al. . |
| 5,504,861 | 4/1996 | Crockett et al. . |
| 5,664,150 | 9/1997 | Isaac et al. . |
| 5,745,672 | 4/1998 | Stiffler . |

AT THE TIME OF CHECKPOINT

AT THE TIME OF WRITTING DATA INTO THE MAIN MEMORY AFTER CHECKPOINT

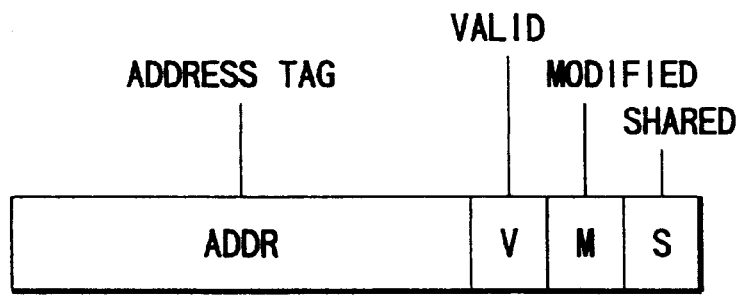
F I G. 6
| VALID | MODIFIED | SHARED | STATE |
| V | M | S | |
|---|---|---|---|
| 0 | – | – | INVALID |
| 1 | 0 | 0 | CLEAN EXCLUSIVE |
| 1 | 0 | 1 | CLEAN SHARED |
| 1 | 1 | 0 | MODIFIED |
F I G. 7

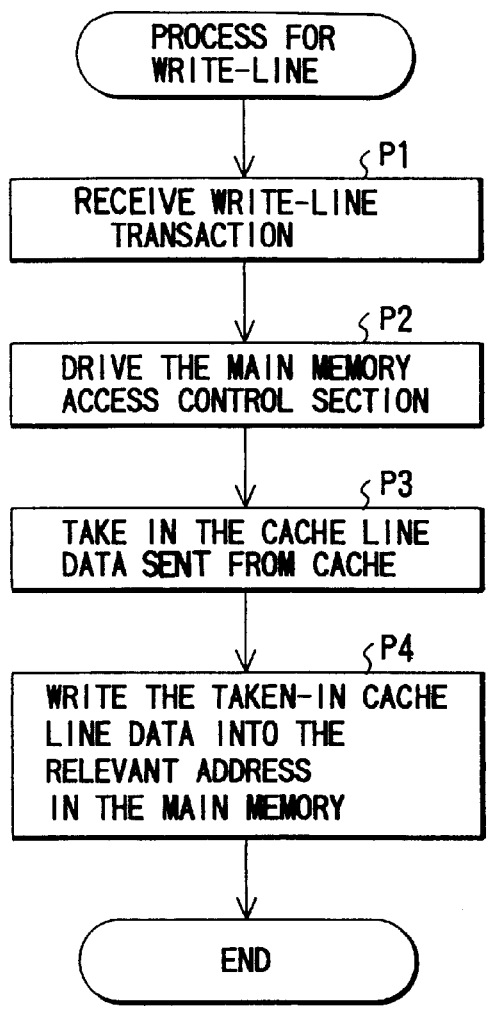
F I G. 8A
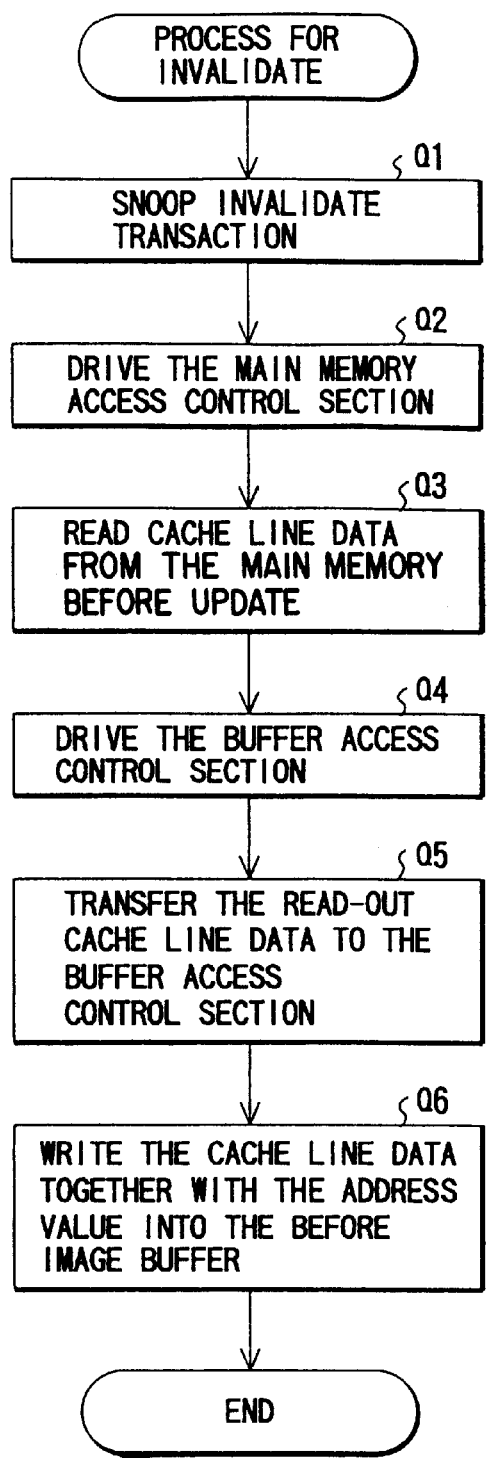
F I G. 8B

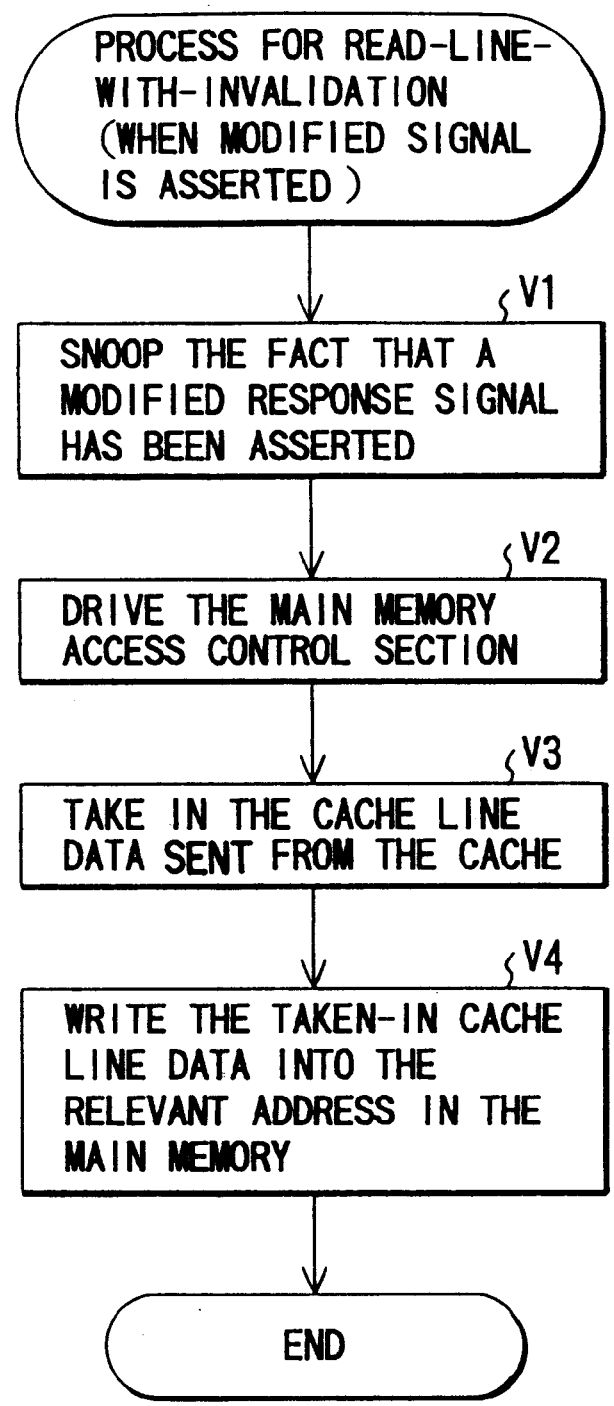
F I G. 8C

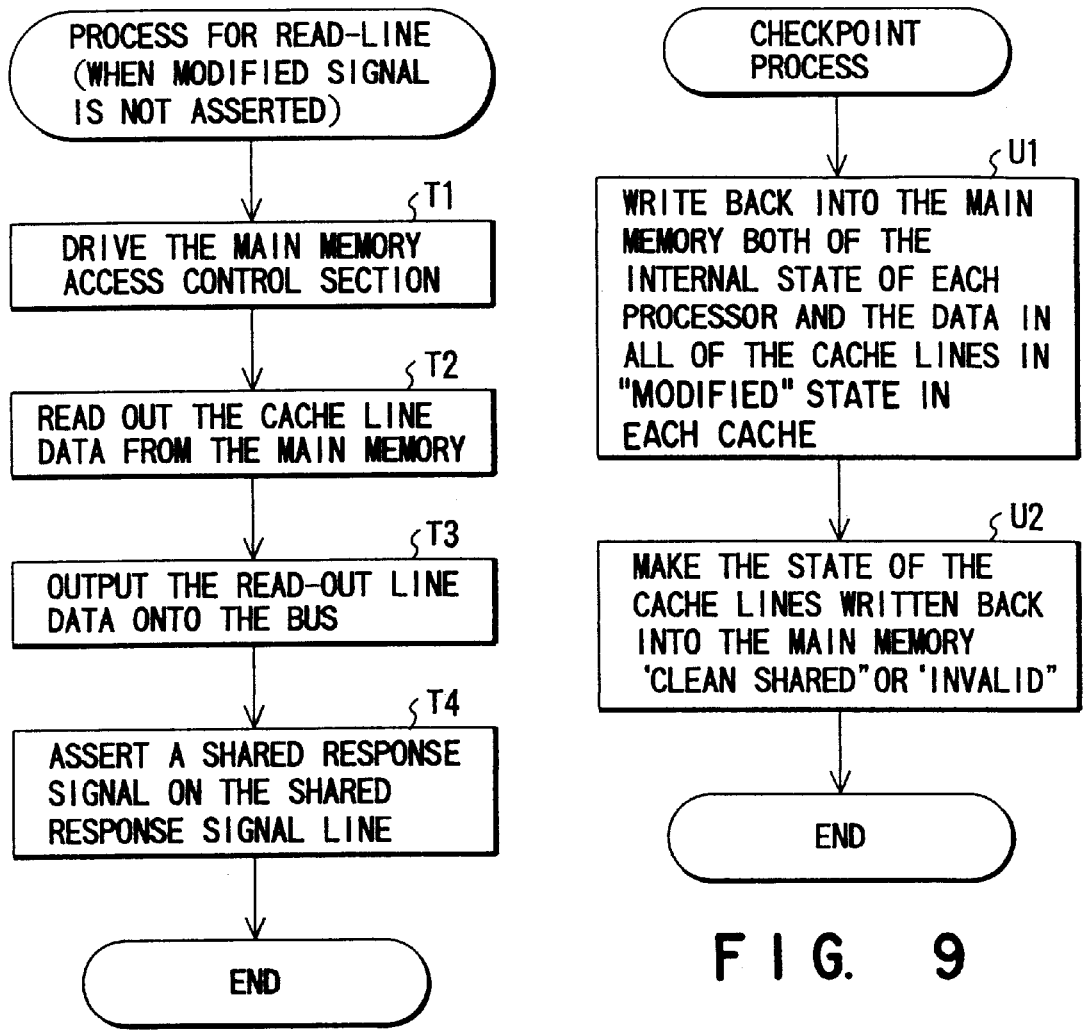

6,079,030

MEMORY STATE RECOVERING APPARATUS

This is a continuation of application Ser. No. 08/665,628, filed Jun. 18, 1996 now U.S. Pat. No. 5,913,021, which is incorporated herein by reference.

BACKGROUND OF THE INVENTION

1. Field of the Invention

The present invention relates to a memory state recovering apparatus capable of restoring the contents of a memory to the original state in a computer system.

2. Description of the Related Art

After having executed a program and finished the process, ordinary computers generally cannot return control to the preceding state and then restart the process.

In the following various application techniques, however, it is desirable to use the function of returning the contents of the memory to the preceding state and resuming the process at that point in time (the memory state recovering function).

(1) Software Debugging

If any error occurred during the execution of a program, returning control to the preceding state would enable the cause of the error to be analyzed.

(2) Fault Tolerance

If the process stopped due to a failure during the operation of the system, the operation would be allowed to continue without stopping the system, by returning control to the preceding state and resuming the process therefrom.

Such fault tolerance techniques have been disclosed in, for example, Philip A. Bernstein, "Sequoia: A Fault-Tolerant Tightly Coupled Multiprocessor for Transaction Processing," IEEE Computer, Vol. 21, No. 2, 1988.

(3) Back Tracking

In logic programming languages, the back tracking of the executed state is a basic operation. Use of the function of returning the contents of the memory to the preceding state realizes back tracking.

One technique considered to be a method of realizing the aforementioned memory state recovering function is a backward recovery method.

FIG. 1 shows a block diagram of a system using the backward recovery method. The system of FIG. 1 comprises a processor 30, a memory control section 31, a main memory 32, and a before image buffer 33.

The before image buffer 33 is a memory for retaining the preceding state of the main memory 32 under the control of the memory control section 31. A single entry (also called a before image element) consists of a main memory address and data.

An example of the operation of the system constructed as shown in FIG. 1 will be explained below.

Now, consider a case where the processor 30 writes data "Dnew" into location "A" in the main memory 32.

After having received a request for a "Write" process from the processor 30, the memory control section 31, before updating the main memory 32, reads data "Dold" stored in the same location "A" and stores it together with the address value "A" of the location in the before image buffer 33. Thereafter, the memory control section 31 writes data "Dnew" into location "A" in the main memory 33.

Each time receiving a request for a "Write" process from the processor 30, the memory control section 31 repeats the operation and stores an address in the main memory 31 and the data therein in another entry in the before image buffer 33 in sequence.

To bring the main memory 32 into the preceding state, the memory control section 31 sequentially reads the entries (addresses "A" and data "Dold") stored in the before image buffer 33, starting with the latest one, and writes data "Dold" in the memory locations with the addresses "A" in sequence.

In general, to resume the execution of the program from a certain state, not only the preceding contents of the main memory 32 but also the preceding internal state of the processor 30 are required. One of the methods of retaining the internal state of the processor 30 is a checkpoint method that stores the internal state in the main memory 32 at suitable time intervals. In the checkpoint method, the timing of storing the internal state is referred to as a checkpoint, and the act of storing the contents of the main memory 32 and the internal state of the processor 30 is referred to as performing a checkpoint.

In performing a checkpoint, the before image buffer 33 is cleared at the same time. As a result, in the before image buffer 33, the original values of the locations (addresses) in the main memory 32 updated from the latest checkpoint up to now are stored.

This makes it possible to return control of the program from any point in time to the latest checkpoint.

Such techniques have been disclosed in, for example, Rok Sosic, "History Cache: Hardware Support for Reverse Execution," Computer Architecture News, Vol. 22, No. 5, 1994.

Next, an example of applying the above-described memory state recovering function to a multiprocessor system will be explained.

FIG. 2 shows a multiprocessor system where n processors 30-1 to 30-n are connected to each other via a bus 34. A memory control section 31 receives a processing request from each of the processors 30-1 to 30-n via the bus 34.

In the multiprocessor system of FIG. 2, too, the operation of the memory control section 31, main memory 32, and before image buffer 33 can be controlled similarly to the configuration of FIG. 1.

Specifically, each time receiving a request for a "Write" process from each of the processors 30-1 to 30-n, the memory control section 31 reads the relevant data "Dold" from the main memory 32 before updating the main memory 32 and sequentially stores it together with the address in the before image buffer 33.

To bring the main memory 32 into the preceding state, the memory control section 31 sequentially reads the entries (addresses "A" and data "Dold") stored in the before image buffer 33, starting with the latest one, and writes data "Dold" in the memory locations with the addresses "A" in sequence.

By performing a checkpoint at suitable time intervals and storing the internal states of all of the processors 30-1 to 30-n, it is possible to return control from any point in time to the checkpoint and resume the process.

It is a common practice that today's processors have cache memory to speed up memory access. Cache memories come in two types: write-through cache memories and copy-back cache memories.

In the case of the write-through cache, when the processor has executed a write process, the value of the data stored in the cache is updated and at the same time, the data stored in the main memory is updated to the value retained in the cache. Therefore, the contents of the cache provided for the processor coincides with the contents of the main memory, so that the memory state recovering function can be realized using the same techniques as described above. The checkpoint processing can be effected in the same manner.

In the case of the copy-back cache, when the processor has executed a write process, what is updated is only the value in the cache and the updated contents are not reflected immediately in the main memory. Thereafter, only when the data updated as a result of replacing the cache entry is written into the main memory, the contents of the main memory are updated. When the contents of the cache are written into the main memory (in the case of a "Write-Line" process), the writing is usually effected on a cache line basis, each cache line consisting of a plurality of words.

FIG. 3 shows a multiprocessor system where n processors 30-1 to 30-n are provided with caches 40-1 to 40-n, respectively. When the caches 40-1 to 40-n are copy-back caches, the multiprocessor of FIG. 3 operates as follows in order to realize the memory state recovering function.

At the time of a checkpoint, as shown in FIG. 4A, not only the internal state of the processor but also all of the updated data items ("A", "B", "C") that are held in the caches and not reflected in the main memory 32 are written back into the main memory 32, thereby storing the system state at this checkpoint. The process for writing the updated data items ("A", "B", "C") back into the main memory 32 is carried out in the same manner as the case that will be described below, in which the before image is retained. Thereafter, the before image buffer 33 is cleared.

When a cache has issued a request for a "Write-Line" process to the memory control section 31 after the checkpoint, that is, when the data (the cache line including "a") updated in the cache is to be reflected in the main memory 32, the memory control section 31 transfers the data to the before image buffer 33 to save the contents of the data retained at the checkpoint.

Specifically, when receiving a request for a "Write-Line" process from the cache, the memory control section 31 reads the line data "Dold-line" (including data "A") from location "Aline" to be written back into in the main memory 32, and stores "Dold-line" together with address value "Aline" in the before image buffer 33 (a single line entry stored in the before image buffer 33 consists of a line address in the main memory 32 and line data). Thereafter, the memory control section 31 writes back the updated data (the cache line including data "a") in the cache into the main memory 32.

To return the contents of the main memory 32 to the preceding state (the state at the immediately preceding checkpoint), the memory control section 31 sequentially reads the entries (addresses "Aline" and line data items "Dold-line") stored in the before image buffer 33, starting with the latest one, and writes the line data items "Dold-line" into the memory locations with the line addresses "Aline" in sequence. This makes it possible to return the main memory 32 to the state at the preceding checkpoint (provided that only the data in the main memory 32 is considered).

At the time of a checkpoint, however, all of the data updated in the cache and not reflected in the main memory 32 must be written back in unison into the main memory 32. As a result, many requests for a "Write-Line" process have been issued intensively to the memory control section 31. Because the data is written back into the main memory 32, the old data existing in the main memory 32 and going to be written back into must be stored in the before image buffer 33 in unison.

With the memory state recovering function as described above, since a single "Write-Line" process requires two accesses for reading and writing data from and into the main memory 32 and a write access to the before image buffer 33, very many memory accesses occur at a checkpoint where many "Write-Line" processes take place intensively.

At the checkpoint where a lot of memory accesses take place, because the system looks as if it stopped in the meantime and cannot preform the remaining ordinary processes, if much time is spent on the checkpoint process, a decrease in the processing efficiency of the entire system will result.

The tendency gets more noticeable as the number of processors increases or the number of cache lines to be written at the time of a checkpoint increases because of an increase in the capacity of a cache. This raises a serious problem in constructing a large-scale and high-performance system.

As explained above, with a conventional memory state recovering apparatus, in case of writing the line data from the cache into the main memory, the old data is read from the main memory and is retained in the before image buffer 33. Further, in case of performing a checkpoint in a multiprocessor system using copy-back caches, all of the updated data stored in the cache is written back into the main memory in unison.

This causes that the process for storing the relevant data items in the main memory 32 in the before image buffer 33 is concentrated at the time of copying back. Therefore, the time required for the checkpoint process increases and another process cannot be executed during the checkpoint process. As a result, the system performance is degraded.

SUMMARY OF THE INVENTION

The object of the present invention is to provide a computer system, such as a multiprocessor, capable of improving the system performance by shortening the time required for a checkpoint process.

According to a first aspect of the present invention, there is provided a memory state recovering apparatus comprising at least one processor capable of processing data; at least one copy-back cache that is provided to correspond to the processor and issues various transactions in accordance with an access request of the processor, and that has a data consistency maintenance function; a main memory for holding data necessary for the data processing at the processor; a buffer memory for storing a set of the data in the main memory before update and its address; and memory access control means responsive to a transaction issued from the cache when the processor has made a write access request to the corresponding cache, storing in the buffer memory the set of the address and corresponding data which has held in the main memory and is targeted by the transaction.

In the memory state recovering apparatus, the memory access control means may include checkpoint execution means for storing the internal state of the processor and the data in the cache in a modified state in the main memory at predetermined time intervals. Furthermore, the buffer memory may be provided in the main memory.

According to a second aspect of the present invention, there is provided a memory state recovering apparatus comprising a bus; a plurality of processors capable of processing data; a plurality of copy-back caches that are connected to each other via the bus and provided to correspond to the processors and issue various transactions in accordance with access requests of the processors, and that have a data consistency maintenance function; a main memory for holding data necessary for the data processing at the processors; a buffer memory for storing a set of the data in the main memory before update and its address; and memory access control means that is connected to the bus and responsive to a transaction issued from the cache when one of the plurality of processors has made a write access request to the corresponding cache, storing in the buffer memory the set of the address and corresponding data which has held in the main memory and is targeted by the transaction.

In the memory state recovering apparatus, the memory access control means may include checkpoint execution means for storing the internal states of the plurality of processors and the data in the plurality of caches in a modified state in the main memory at predetermined time intervals. Furthermore, the memory access control means may include means for snooping various transactions issued onto the bus. Still furthermore, the memory access control means may include means for, when the transaction issued from the cache is an invalidation transaction to specify the invalidation of the corresponding cache lines in other processors, reading from the main memory the address and corresponding data in the main memory indicated by the transaction and storing them in the buffer memory. In addition, the memory access control means may include means for, when the transaction issued from the cache is a read invalidation transaction to specify not only the reading of the data from the main memory or the corresponding cache lines in other processors but also the invalidation of the corresponding cache lines in the other processors, reading the address and corresponding data in the main memory indicated by the transaction or the data on the corresponding cache lines of the other processors and storing them in the buffer memory. Additionally, the buffer memory may be provided in the main memory.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principles of the present invention in which:

FIG. 6 is a drawing to help explain an example of a cache tag entry in the embodiment;

FIG. 7 is a table to help explain the states of the cache lines in the embodiment;

FIGS. 8A to 8F are flowcharts to help explain the operation of the memory control section in the embodiment;

FIG. 9 is a flowchart to help explain the checkpoint process in the embodiment.

DETAILED DESCRIPTION OF THE PREFERRED EMBODIMENTS

Hereinafter, referring to the accompanying drawings, an embodiment of the present invention will be explained.

Figure 1:
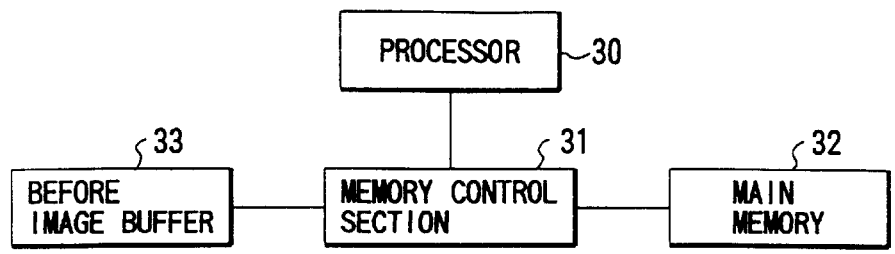
FIG. 1 is a block diagram showing the configuration of a system using a conventional backward method.
Figure 2:
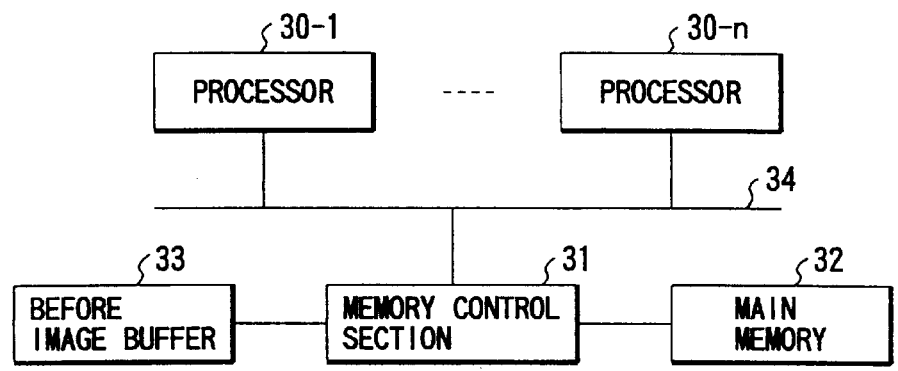
FIG. 2 is a block diagram of a multiprocessor to help explain a conventional memory state recovering function.
Figure 3:
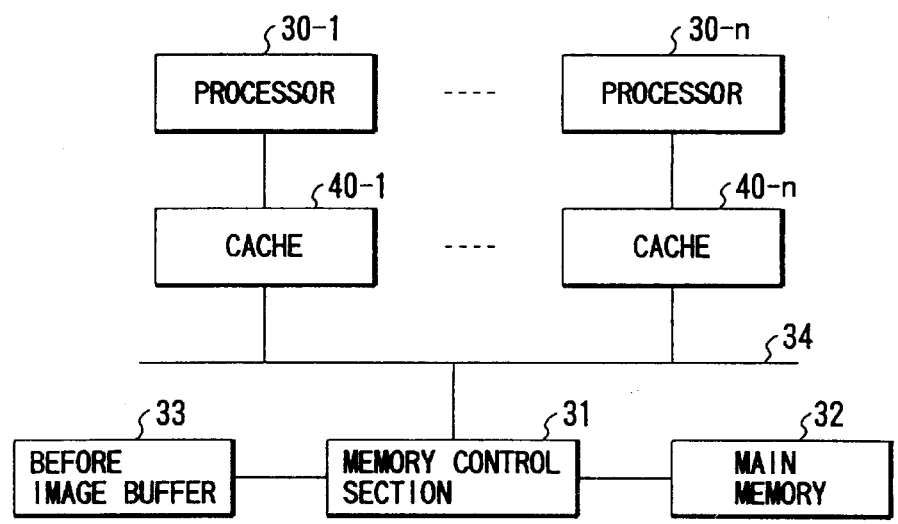
FIG. 3 is a block diagram of a multiprocessor with caches to help explain a conventional memory state recovering function.
Figure 4A:
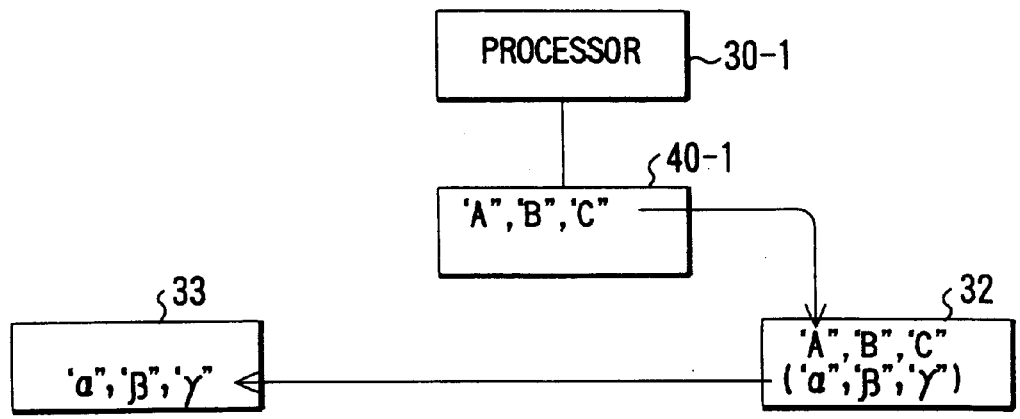
FIGS. 4A and 4B are block diagrams to help explain a conventional memory state recovering function.
Figure 4B:
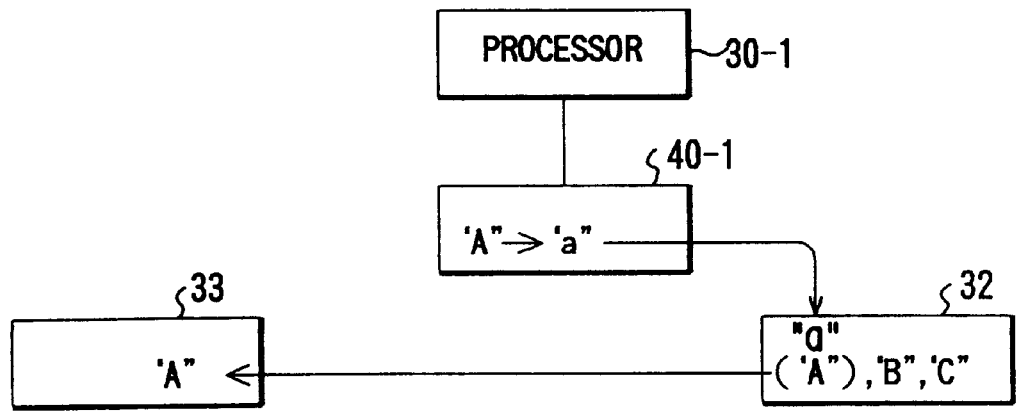
Figure 5:
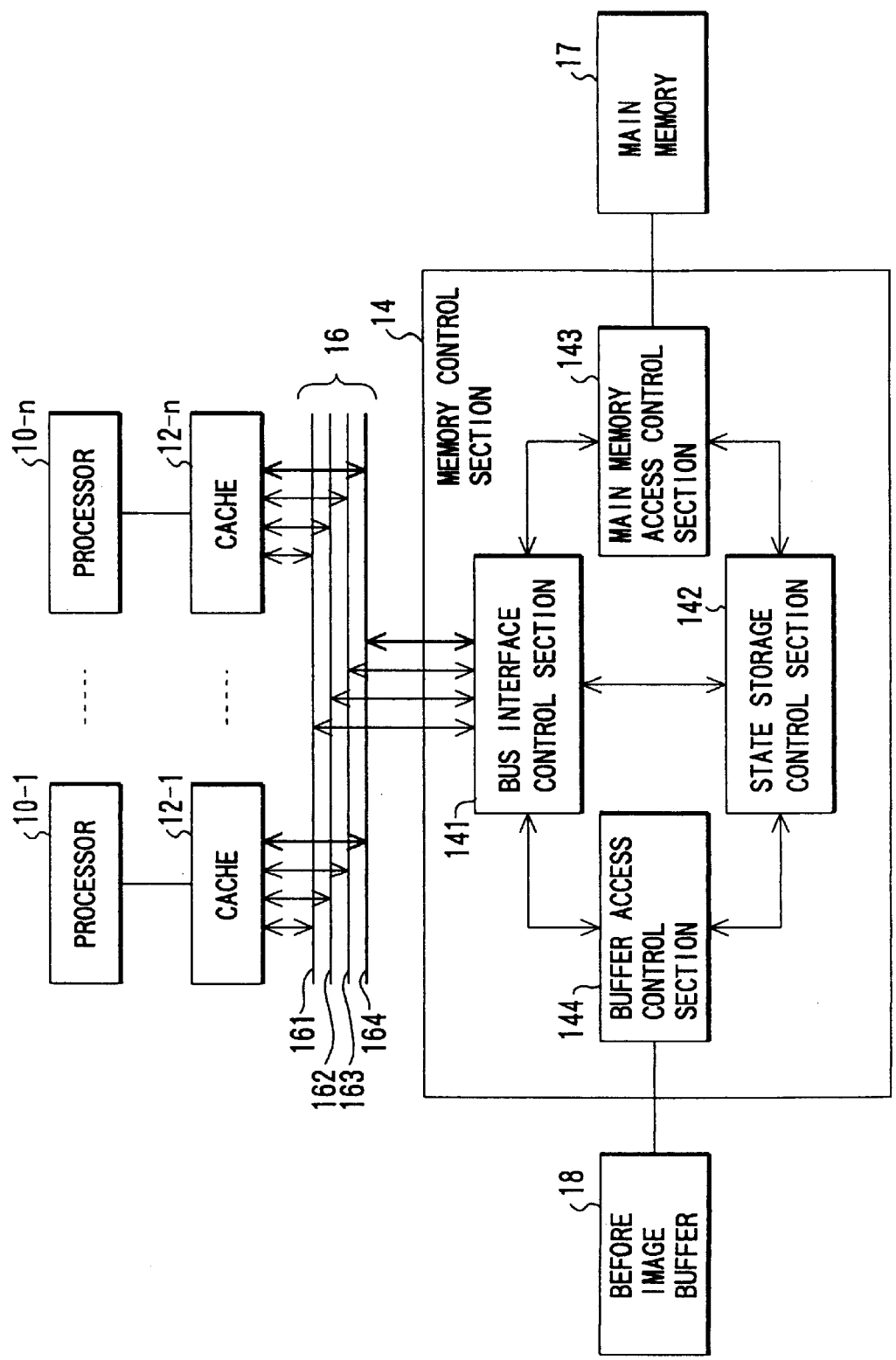
FIG. 5 is a schematic block diagram showing a configuration of a computer system (multiprocessor system) according to an embodiment of the present invention.
Figure 8D:
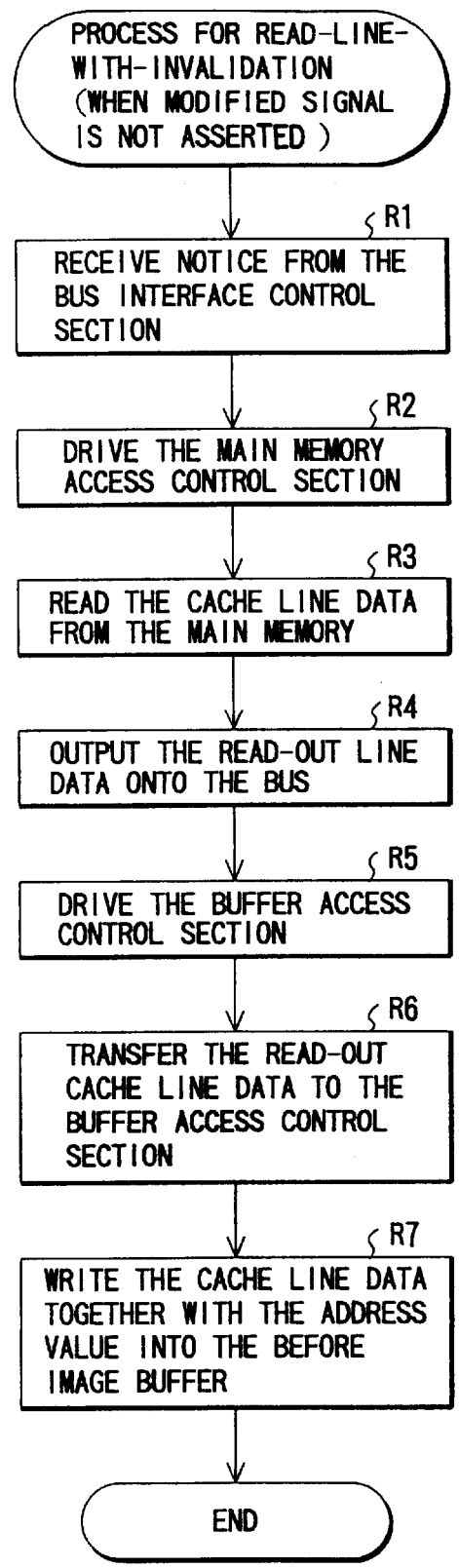
Figure 8E:
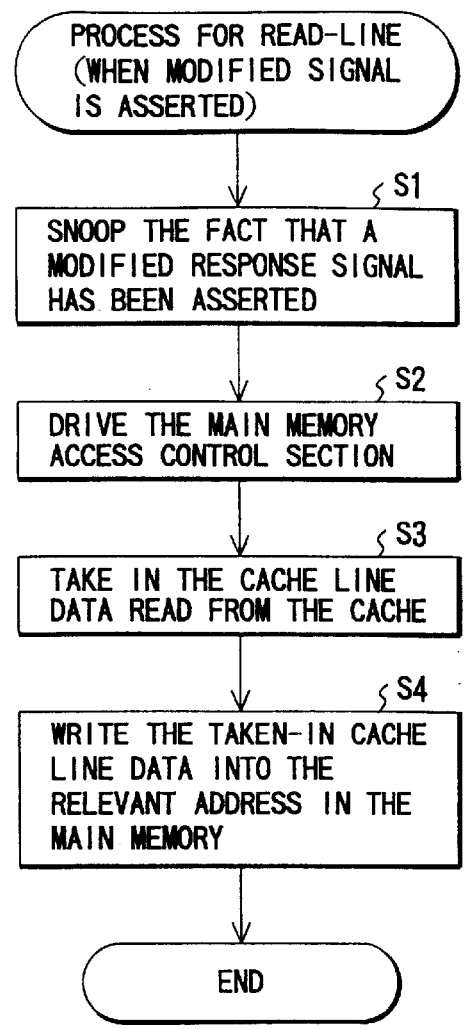

FIG. 5 shows a schematic configuration of a computer system (multiprocessor system) according to an embodiment of the present invention. As shown in FIG. 5, the multiprocessor system of the embodiment is provided with n processors 10-1 to 10-n and n caches 12-1 to 12-n provided so as to correspond to the processors 10-1 to 10-n respectively. The caches 12-1 to 12-n are connected to a memory control section 14 via a bus 16. A main memory 17 and a before image buffer 18 are connected to the memory control section 14.

The memory control section 14 includes a bus interface control section 141, a state storage control section 142, a main memory access control section 143 and a buffer access control section 144.

The bus interface control section 141 is directly connected to the bus 16 and controls the bus. The bus interface control section 141 always monitors the bus 16 and operates according to a transaction issued onto the bus 16. The state storage control section 142 controls the various functions necessary for storing the states of the main memory 17. The main memory access control section 143 is connected to the main memory 17 and controls access to the main memory 17. The buffer access control section 144 is connected to the before image buffer 18 and controls access to the before image buffer.

The caches 12-1 to 12-n are copy-back caches and realize a protocol for maintaining consistency in data.

The caches 12-1 to 12-n consist of data memory for holding cache line data and tag memory for holding information to manage the cache line data items stored in the data memory.

FIG. 6 shows an example of an entry in the tag memory. In the tag memory, an address tag indicating the cache line address (ADDR) of the corresponding cache line data and 3-bit data representing the state of the cache line data are stored.

The state of the cache line data is managed by combinations of 3 bits: Valid (V), Modified (M), and Shared (S). Valid (V) indicates that the corresponding cache line data is valid ("1"). Modified (M) denotes that the corresponding cache line data has been updated in the cache. Shared (S) represents that the same cache line data exists in the cache of another processor.

Accordingly, combinations of 3 bits enable the cache line data to take four states as shown in FIG. 7.

Transactions issued from the cache onto the bus 16 related to copy-back caches include the following:

(1) "Read-Line"—the reading of cache line data. This is issued in a case where the corresponding valid cache line data does not exist in the cache and a cache miss takes place, when a processor has read access to a cache line with a certain address.

A cache miss occurs when the address indicating the cache line data to be accessed has not stored in the tag memory, or when the valid bit (V) is invalid ("0") although the address has been stored. In contrast, a cache hit takes place when the address of the cache line data to be accessed is stored in the tag memory and Valid bit (V) represents valid ("1").

(2) "Read-Line-with-Invalidation"—the reading of cache line data and the invalidation of the data stored in another cache. This is issued when a cache miss takes place at the time of write access by the processor.

(3) "Write-Line"—the writing of cache line data. This is issued when the cache line data is written into the main memory 17 under instructions from a processor, when the updated data is written into the main memory 17 because the cache line data must be replaced, or when the updated data is written into the main memory 17 by request of another processor.

(4) "Invalidate"—the invalidation of the data in another cache. This is issued when the relevant line exists in the cache and is "Clean Shared" at the time of write access. by the processor. The transaction itself involves only address transfer and not data transfer.

In general, although transactions related to copy-back caches other than those in items (1) to (4) are also supported in many cases, explanation of them will not be given here because they are not directly related to the gist of the present invention.

The bus 16 includes a shared response signal line 161, a modified response signal line 162, a bus command signal line 163, and an address/data signal line 164. Although besides these lines, the bus generally contains other signal lines including a signal line for arbitration, explanation of them will not be given here because they are not directly related to the gist of the present invention.

The shared response signal line 161 (shared) is used to inform that the cache line data targeted by the transaction is retained (or shared), when another processor/cache has issued a transaction.

The modified response signal line 162 (modified) is used to inform that the cache line data targeted by the transaction is retained in an updated state, when another processor/cache has issued a transaction.

The bus command signal line 163 (command) is used to send various pieces of information on transactions besides indicating the types of the above-described bus transactions (1) to (4).

The address/data signal line 164 (address/data) is a signal line for transferring the address of the cache line data targeted by the transaction and the data. Although in FIG. 5, the address/data signal line is represented by a single signal line, it may be realized by using common signal lines in a time division manner or by providing a separate signal line for each of the addresses and data items.

Explained now will be the operation of the multiprocessor of the embodiment, that is, how a data consistency maintenance protocol between caches is realized using bus transactions.

What will be explained here are the operation of a processor and cache (a master processor) that issue a transaction and starts access, the operation of another processor and cache (a slave processor) that operate in response to the transaction issued by a processor/cache, and the operation of the memory control section 14.

First, the operation of the master processor that issues a transaction and starts access and the transition of the state of the cache corresponding to the issued transaction will be explained. In explanation, processor 10-1 (cache 12-1) is assumed to be the master processor.

(A1) Read Access (cache hit)

When a cache hit takes place in cache 12-1 as a result of processor 10-1 having made a read access request, the relevant data is read from cache 12-1. Processor 10-1 (cache 12-1) does not issue a transaction to the bus 16. At this time, the state of the cache line remains unchanged.

(A2) Read Access (cache miss)

When a cache miss occurs as a result of processor 10-1 having made a read access request, processor 10-1 (cache 12-1) issues a "Read-Line" transaction to the bus 16.

In response to this, when a modified response signal is asserted via the modified response signal line 162, this means that one of the other caches retains the updated data on the line (the details of the operation on the slave processor will be explained later). Cache 12-1 takes in the cache line data written from the cache having asserted the modified response signal into the main memory 17 (outputted onto the address/data signal line 164) and stores it in the data memory. Cache 12-1 makes the state of the cache line "Clean Shared".

On the other hand, when a modified response signal is not asserted and a shared response signal is asserted via the shared response signal line 161, this means that another cache holds the line in a clean state. Cache 12-1 not only makes the state of the cache line "Clean Shared" but also takes in the data read from the main memory 17 and stores it into the data memory.

Additionally, when neither a modified response signal nor a shared response signal is asserted, this means that none of the caches retains the targeted cache line data. Cache 12-1 makes the state of the cache line "Clean Exclusive." In this case, too, cache 12-1 takes in the data read from the main memory and stores it into the data memory.

In each case, cache 12-1 returns the necessary one of the cache line data items taken in from the bus 16 to the processor 10-1.

(A3) Write Access (cache hit/modified)

When a cache hit takes place in cache 12-1 as a result of processor 10-1 having made a write access request and the corresponding cache line data is in the modified state, the data is written into the relevant cache line. Processor 10-1 (cache 12-1) does not issue a transaction to the bus 16. At this time, the state of the cache line remains unchanged.

(A4) Write Access (cache hit/clean exclusive)

When a cache hit takes place in cache 12-1 as a result of processor 10-1 having made a write access request and the corresponding cache line data is in the clean exclusive state, the data is written into the relevant cache line. Processor 10-1 (cache 12-1) does not issue a transaction to the bus 16. The cache 12-1 changes the state of the relevant cache line to "Modified."

(A5) Write Access (cache hit/clean shared)

When a cache hit takes place in cache 12-1 as a result of processor 10-1 having made a write access request and the corresponding cache line data is in the clean shared state, the processor 10-1 (cache 12-1) issues a "Invalidate" transaction to the bus 16, and the cache 12-2 makes the state of the relevant cache line "Modified" and writes the data.

(A6) Write Access (cache miss)

When a cache miss occurs as a result of processor 10-1 having made a read access request, processor 10-1 issues a "Read-Line-with-Invalidation" to the bus 16.

In response to this, when a modified response signal is asserted, this means that one of the other caches retains the updated data on the line. Cache 12-1 takes in the cache line data written from the cache having asserted the modified response signal into the main memory 17 and stores it in the data memory.

On the other hand, when a modified response signal is not asserted, cache 12-1 takes in the data read from the main memory 17 and stores it in the data memory.

In each case, cache 12-1 makes the state of the relevant cache line "Modified" and is written into.

Explained next will be the operation of another processor and its corresponding cache (slave processor) in response to a transaction issued by a processor/cache and the transition of the state. It is assumed that the master processor is processor 10-1 (cache 12-1) and the slave processor is processor 10-n (cache 12-n). Explanation will be given about each transaction issued from the master processor.

(B1) "Read-Line" transaction

When cache 12-n holds the cache line data targeted by a transaction in a "Modified" state, it asserts a modified response signal 162 and informs that it retains the updated data. Thereafter, cache 12-n issues a "Write-Line" transaction and writes the updated data into the main memory 1.7. Cache 12-n makes the relevant cache line "clean shared."

When cache 12-n holds the cache line data targeted by a transaction in an "Clean Exclusive" or "Clean Shared" state, it asserts a shared response signal 161 and informs that it retains the clean data. In each case, cache 12-n makes the state of the cache line "Clean Shared."

When cache 12-n does not hold the corresponding valid cache line data, it does not do anything.

(B2) "Read-Line-with-Invalidation" transaction

When cache 12-n holds the cache line data targeted by a transaction in a "Modified" state, it asserts a modified response signal 162 and informs that it retains the updated data. Thereafter, cache 12-n issues a "Write-Line" transaction and writes the updated data into the main memory 17. Cache 12-n makes the state of the cache line "Invalid."

When cache 12-n holds the cache line data targeted by a transaction in an "Clean Exclusive" or "Clean Shared" state, it makes the state of the cache line "Invalid."

When cache 12-n does not hold the corresponding valid cache line data, it does not do anything.

(B3) "Invalidate" transaction

When cache 12-n holds the cache line data targeted by a transaction in an "Clean Exclusive" or "Clean Shared" state, it makes the state of the cache line "Invalid."

When cache 12-n does not hold the corresponding valid cache line data, it does not do anything.

In this case, it is impossible that cache holds the corresponding line in a "Modified" state.

(B4) "Write-Line" transaction

Cache 12-n does not do anything.

Now, the operation of the memory control section 14 in response to each bus transaction will be explained by reference to the flowcharts of FIGS. 8A to 8F. Control of the operation of retaining the state of the main memory in the memory control section 14 is performed by the state storage control section 142. Hereinafter, explanation will be given about each transaction issued to the bus 16.

(C1) "Write-Line" transaction

After the bus interface control section 141 has received a "Write-Line" transaction issued onto the bus 16 (step P1), the state storage control section 142 drives the main memory access control section 143 (step P2). The main memory access control section 143 takes in the cache line data sent from the cache, via the bus interface control section 141 (step P3) and writes it into the relevant address in the main memory 17 (step P4).

(C2) "Invalidate" transaction

After the bus interface control section 141 has snooped an "Invalidate" transaction issued onto the bus 16 (step Q1), the state storage control section 142 drives the main memory access control section 143 (step Q2). The main memory access control section 143 reads the cache line data before updated from the memory location with the address of the cache line to be invalidated that is obtained via the bus interface control section 141 (step Q3). The state storage control section 142 drives the buffer access control section 144 (step Q4). The state storage control section 142 transfers the cache line data read by the main memory access control section 143 to the buffer access control section 144 (step Q5), which is caused to write the cache line data together with the address value into the before image buffer 18 (step Q6).

(C3) "Read-Line-with-Invalidation" transaction

When a modified response signal has been asserted as a result of the issuing of a "Read-Line-with-Invalidation" transaction, this means that the cache that has made the assertion holds the updated data and that its processor has executed a write access after the latest checkpoint. Namely, as described in item (A5), before a write access is executed, an "Invalidate" transaction has been issued to the bus 16 and the process in item (C2) has already been executed, or as described below, "Read-Line-with-Invalidation" transaction has been issued and the back-up process has been executed without assertion of the modified response signal against the transaction.

Thus, at that point in time, the preceding data has been stored in the before image buffer 18, so that the data at the address need not be stored in the before image buffer again. Consequently, the state storage control section 142 need not do anything.

When the bus interface control section 141 snoops the fact that a modified response signal has been asserted, as a result of the issuing of a "Read-Line-with-Invalidation" transaction (step V1), the state storage control section 142 drives the main memory access control section 143 (step V2). The main memory access control section 143 takes in the line data sent from the cache via the bus interface control section 141 (step V3) and writes it into the relevant. address in the main memory 17 (step V4).

On the other hand, when a modified response signal has not been asserted as a result of the issuing of a "Read-Line-with-Invalidation" transaction, the state storage control section 142 receives notice from the bus interface control section 141 (step R1) and drives the main memory access control section 143 according to the notice (step R2). The main memory access control section 143 reads the cache line data from the memory location in the main memory 17 indicated by an address as the target of invalidation and obtained via the bus interface control section 141 (step R3). The bus interface control section 141 outputs the line data read by the main memory access control section 143 onto the bus 16 (step R4). The state storage control section 142 drive the buffer access control section 144 (step R5), transfers the cache line data read by the main memory access control section 143 to the buffer access control section 144 (step R6), which is caused to write the data together with the address value in the before image buffer 18 (step R7).

(C4) "Read-Line" transaction

When the bus interface control section 141 snoops the fact that a modified response signal has been asserted, as a result of the issuing of a "Read-Line" transaction (step S1), the state storage control section 142 drives the main memory access control section 143 (step S2). The main memory access control section 143 takes in the line data sent from the cache via the bus interface control section 141 (step S3) and writes it into the relevant address in the main memory 17 (step S4).

On the other hand, when a modified response signal 162 has not been asserted, the state storage control section 142 drives the main memory access control section 143 (step T1). The main memory access control section 143 reads the cache line data from the memory location in the main memory 17 indicated by the address to be read and obtained via the bus interface control section 141 (step T2). The bus interface control section 141 outputs the line data read by the main memory access control section 143 onto the bus 16 (step T3). The state storage control section 142 asserts a shared response signal on the shared response signal line 161 via the bus interface control section 141 (step T4). This makes the state of the cache line currently targeted in the cache of the master processor "Clean Shared", not "Clean Exclusive."

The reason why the state of the cache line is made "Clean Shared," not "Clean Exclusive" is as follows.

As explained in item A4 about the master processor, when the data is written into a cache line in a "Clean Exclusive" state, the value is replaced in the cache without the issuing of a transaction. As a result, at this point in time, it is impossible to store in the before image buffer 18 the memory state (of the targeted cache line data) before the writing of data into the main memory.

To overcome this problem, a method can be considered which stores the memory state when the line data is written from the cache into the main memory 17, that is, when "Write-Line" transaction is issued onto the bus 16. This, however, is basically the same as the conventional one and has the problem that the checkpoint processing time is long.

If there is no "Clean Exclusive" state, either an "Invalidate" or a "Read-Line-with-Invalidation" transaction will never fail to be issued in write access. By using the transaction as conditions for starting the process of transferring the data from the main memory 17 to the before image buffer 18, the memory control section 14 can store the memory state before the writing as described above.

When the processors 10-1 to 10-n and the caches 12-1 to 12-n are provided with the function of avoiding the "Clean Exclusive" state, the memory control section 14 need not assert a shared response signal 161.

Next, the checkpoint process in the multiprocessor that operates as described above will be explained by reference to the flowchart of FIG. 9.

At the time of a checkpoint, the internal states of the processors 10-1 to 10-n are written into the main memory 17 and the data items in all of the cache lines in the "Modified" state in the respective caches 12-1 to 12-n are written back into the main memory 17 (step U1). Since a process for writing the internal states in the processors is also executed via the caches in practice, any special treatment is not required on the bus transaction. The caches 12-1 to 12-n make "Clean Shared" or "Invalid" the states of the cache lines from which the data items have been written back into the main memory 17 (step U2).

Since the writing back of the data into the main memory 7 is effected using a "Write-Line" transaction, the data will never be stored in the before image buffer 18 at this time.

Specifically, before the start of the process for writing back from the cache into the main memory, the data in the main memory 17 corresponding to the data updated in the caches 12-1 to 12-n has been stored in the before image buffer 18 as explained in items (C2) and (C3), so that the checkpoint process finishes with the process of writing the data into the main memory 17.

Figure 10:
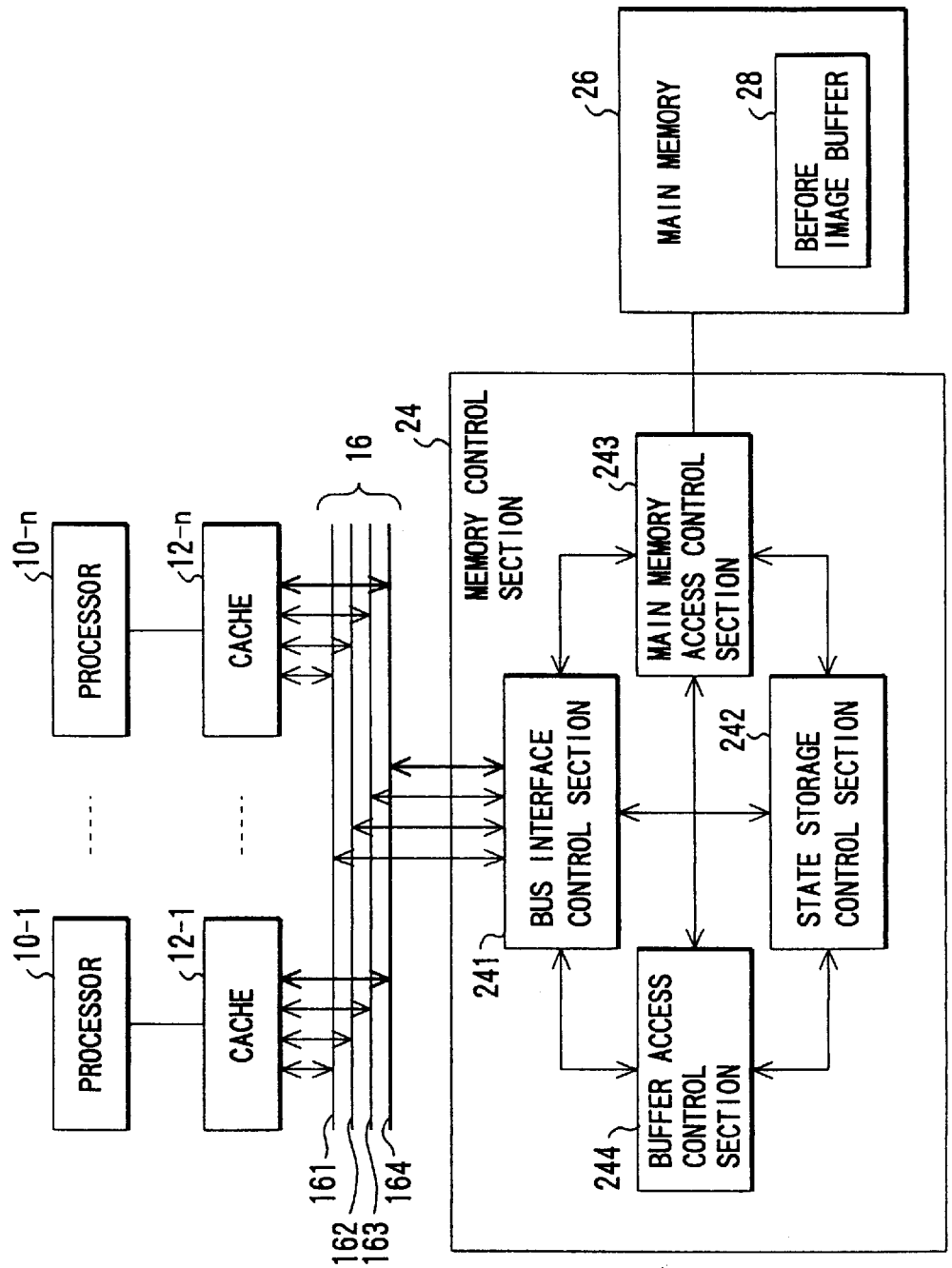
FIG. 10 is a block diagram showing another configuration of the multiprocessor system according to the present invention.

FIG. 10 shows another configuration of the multiprocessor system using the present invention.

In the configuration of FIG. 10, part of the main memory 26 is used as the before image buffer 28.

The buffer access control section 244 accesses the before image buffer 28 in the main memory 26 via the main memory access control section 243. The remaining control is the same as that in the configuration of FIG. 5.

The configuration of FIG. 10 does not require a special memory independent of the main memory as a before image buffer, which makes it easy to construct a system.

While in the embodiment, copy-back caches are used, the present invention may, of course, be applied to a computer system in which the data in the copy-back mode intermingles with the data in the non-copy-back mode. Namely, the present invention is applied to the data in the copy-back mode and a conventional method is applied to the data in the non-copy-back mode.

Further, while in the embodiment, a multiprocessor system having a plurality of processors 10-1 to 10-n is used, the present invention may be applied to a computer system composed of a single processor, provided that the caches have the same function.

Furthermore, the invention may be applied to caches forming a hierarchic structure, not a single cache.

When a transaction for invalidating the data issued from a cache onto the bus 16 and stored in another cache has been snooped, the memory control section 14 stores in the before image buffer 18 the cache line data retained in the main memory 17 and going to be invalidated.

Specifically, because the cache line data in the main memory 17 is stored in the before image buffer 18 according to "Invalidate" issued when a cache hit has occurred at the time of the master processor having made a write request and the cache line targeted is in a "Clean Shared" state, or to "Read-Line-with-Invalidation" issued when a cache miss has occurred at the time the master processor having made a write request, the storing process is executed before the cache line data targeted is actually written back into the main memory 17.

Accordingly, even if a large volume of updated items must be written back into the main memory 17, a process for this is not necessary because the data to be written back has already been stored in the before image buffer 18. This shortens the time required for the checkpoint process, which alleviates an adverse effect on the other ordinary processes, thereby improving the processing efficiency of the entire system.

As has been explained in detail, with the present invention, because the process of storing the preceding memory state obtained at a checkpoint is carried out in a distributed manner in the course of normal processing, the overhead at the time of a checkpoint is reduced, thereby improving the processing efficiency.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system comprising:

a processor for processing data;

a copy-back cache, coupled to the processor, for storing data responsive to an access request to the processor in accordance with a data consistency maintenance protocol; and a memory subsystem, coupled to the processor and the cache via a bus, wherein the memory subsystem includes:

a primary memory to which data is written and from which data is read;

a buffer memory, coupled to the primary memory, for storing data read from the primary memory;

control means for controlling the primary memory and the buffer memory to store pre-modified data to be modified during any interval between checkpoints in the buffer memory responsive to a transaction issued on the bus; and means for performing a checkpoint process by storing the context of said processor and the data in said cache in a modified state in the primary memory at checkpoints, without accessing the buffer memory.

2. The computer system according to claim 1, wherein the control means includes means for copying the data from the buffer memory to the primary memory, so that the memory subsystem can be returned to a consistent checkpoint state from which processing can resume without loss of data integrity or program continuity following a fault.

3. The computer system according to claim 1, wherein said memory subsystem includes means for storing the pre-modified data in said buffer memory when an invalidate transaction to be issued at occurrence of cache hit in write access to the cache indicating clean shared has been issued on the bus.

4. The computer system according to claim 1, wherein said memory subsystem includes means for storing the corresponding pre-modified data in said buffer memory when a read-line-with-invalidate transaction to be issued at occurrence of cache miss in write access to the cache has been issued on the bus and no modified response signal has been asserted by other caches.

5. A computer system comprising:

a processor for processing data;

a copy-back cache, coupled to the processor, for storing data responsive to an access request to the processor in accordance with a data consistency maintenance protocol; and a memory subsystem, coupled to the processor and the cache via a bus, wherein the memory subsystem includes:

a primary memory to which data is written and from which data is read;

a buffer memory, coupled to the primary memory, for storing data read from the primary memory;

control means for controlling the primary memory and the buffer memory to store pre-modified data to be modified during any interval between checkpoints in the buffer memory responsive to a transaction issued on the bus; and means for performing a checkpoint process by storing the context of said processor and the data in said cache in a modified state in the primary memory at checkpoints, without accessing the buffer memory, wherein said memory subsystem includes means for setting the state of a targeted cache line to clean shared instead of clean exclusive without storing the pre-modified data in said buffer memory when a read-line transaction to be issued at occurrence of cache miss in read access to the cache has been issued on the bus and neither a modified response signal nor a shared response signal has been asserted by other caches.

6. A computer system comprising:

a processor;

a copy-back cache, coupled to the processor, for storing data responsive to an access request to the processor in accordance with a data consistency maintenance protocol; and a memory subsystem, coupled to the processor and the cache via a bus, wherein the memory subsystem includes:

a primary memory to which data is written and from which data is read;

a buffer memory, coupled to the primary memory;

means for determining whether the data read from the primary memory will be modified, responsive to a transaction issued on the bus, and for storing in the buffer memory only data that will be modified during any given interval between checkpoints; and means for performing a checkpoint process by storing the context of said processor and the data in said cache in a modified state in the primary memory at checkpoints, without accessing the buffer memory.

7. The computer system according to claim 6, further comprising means for copying the data from the buffer memory to the primary memory, so that the memory subsystem can be returned to a consistent checkpoint state from which processing can resume without loss of data integrity or program continuity following a fault.

8. The computer system according to claim 6, wherein said memory subsystem includes means for storing the pre-modified data in said buffer memory when an invalidate transaction to be issued at occurrence of cache hit in write access to the cache indicating clean shared has been issued on the bus.

9. The computer system according to claim 6, wherein said memory subsystem includes means for storing the corresponding pre-modified data in said buffer memory when a read-line-with-invalidate transaction to be issued at occurrence of cache miss in write access to the cache has been issued on the bus and no modified response signal has been asserted by other caches.

10. A computer system comprising:

a processor;

a copy-back cache, coupled to the processor, for storing data responsive to an access request to the processor in accordance with a data consistency maintenance protocol; and a memory subsystem, coupled to the processor and the cache via a bus, wherein the memory subsystem includes:

a primary memory to which data is written and from which data is read;

a buffer memory, coupled to the primary memory;

means for determining whether the data read from the primary memory will be modified, responsive to a transaction issued on the bus, and for storing in the buffer memory only data that will be modified during any given interval between checkpoints; and means for performing a checkpoint process by storing the context of said processor and the data in said cache in a modified state in the primary memory at checkpoints, without accessing the buffer memory, wherein said memory subsystem includes means for setting the state of a targeted cache line to clean shared instead of clean exclusive without storing the premodified data in said buffer memory when a read-line transaction to be issued at occurrence of cache miss in read access to the cache has been issued on the bus and neither a modified response signal nor a shared response signal has been asserted by other caches.

* * * * *